United States Patent
Wu

(10) Patent No.: US 12,185,277 B2
(45) Date of Patent: Dec. 31, 2024

(54) DATA RECEIVING METHOD, DATA SENDING METHOD, TERMINAL, AND NETWORK DEVICE

(71) Applicant: VIVO MOBILE COMMUNICATION CO., LTD., Guangdong (CN)

(72) Inventor: Yumin Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 235 days.

(21) Appl. No.: 17/669,501

(22) Filed: Feb. 11, 2022

(65) Prior Publication Data

US 2022/0167306 A1    May 26, 2022

Related U.S. Application Data

(63) Continuation of application No. PCT/CN2020/107392, filed on Aug. 6, 2020.

(30) Foreign Application Priority Data

Aug. 12, 2019  (CN) .......................... 201910741802.0

(51) Int. Cl.
*H04W 68/02* (2009.01)
*H04W 68/00* (2009.01)
*H04W 80/02* (2009.01)

(52) U.S. Cl.
CPC ......... *H04W 68/02* (2013.01); *H04W 68/005* (2013.01); *H04W 80/02* (2013.01)

(58) Field of Classification Search
CPC ............. H04W 68/02; H04W 68/0005; H04W 80/02; H04W 4/08
See application file for complete search history.

(56) References Cited

U.S. PATENT DOCUMENTS

| | | | |
|---|---|---|---|
| 2015/0113128 A1 | 4/2015 | Huang et al. | |
| 2017/0332214 A1* | 11/2017 | Hu | ........................ H04W 4/08 |
| 2018/0213556 A1 | 7/2018 | Rico Alvarino et al. | |
| 2018/0302878 A1 | 10/2018 | Byun et al. | |
| 2020/0252906 A1 | 8/2020 | Chen | |
| 2020/0374921 A1* | 11/2020 | Li | ........................ H04W 68/005 |
| 2020/0413341 A1 | 12/2020 | Xu et al. | |
| 2022/0141801 A1* | 5/2022 | Sharma | .................. H04W 68/02 |
| | | | 455/458 |

(Continued)

FOREIGN PATENT DOCUMENTS

| | | | |
|---|---|---|---|
| CA | 3096830 | * | 9/2020 |
| CN | 101674649 A | | 3/2010 |
| CN | 106792792 A | | 5/2017 |

(Continued)

OTHER PUBLICATIONS

Qualcomm Inc., "Efficient small data transmission with S1-based architecture", SA WG2 Meeting #110, S2-152614, Jul. 6-10, 2015, Dubrovnik, Croatia.

(Continued)

*Primary Examiner* — Jungwon Chang
(74) *Attorney, Agent, or Firm* — Price Heneveld LLP

(57) ABSTRACT

A data receiving method, a data sending method, a terminal, and a network device are provided. The data receiving method includes: receiving a paging message; and when the paging message includes indication information indicating that downlink data of the terminal is to be sent, obtaining the downlink data of the terminal.

18 Claims, 3 Drawing Sheets

---

Send the paging message to the terminal — 401

When the paging message includes related information of a terminal, obtain downlink data of the terminal — 402

(56) References Cited

FOREIGN PATENT DOCUMENTS

| | | | |
|---|---|---|---|
| CN | 107889216 A | | 4/2018 |
| CN | 108235412 A | | 6/2018 |
| CN | 108616901 A | | 10/2018 |
| CN | 108696340 A | | 10/2018 |
| CN | 108738139 A | | 11/2018 |
| CN | 109600831 A | | 4/2019 |
| EP | 3447955 A1 | | 2/2019 |
| EP | 3493644 A1 | | 6/2019 |
| WO | WO 2018/059988 | * | 4/2018 |
| WO | 2018088840 A1 | | 5/2018 |
| WO | WO 2020/085964 | * | 4/2020 |

OTHER PUBLICATIONS

Qualcomm Inc., "Early data transmission", 3GPP TSG RAN WG1 Meeting #90, R1-1712804, Prague, Czechia, Aug. 21-25, 2017.
Samsung Electronics, "Correction to signaling aspects of parameter first-PDCCH-MonitoringOccasionOfPO", 3GPP TSG-RAN2 105, R2-1902261, Athens, Greece, Feb. 25-Mar. 1, 2019.
Samsung Electronics, "Correction to signaling aspects of parameter first-PDCCH-MonitoringOccasionOfPO", 3GPP TSG-RAN2 105, R2-1900126, Athens, Greece, Feb. 25-Mar. 1, 2019.
"3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321 V14.11.0 (Jun. 2019), Valbonne, France.

\* cited by examiner

DATA RECEIVING METHOD, DATA SENDING METHOD, TERMINAL, AND NETWORK DEVICE

CROSS-REFERENCE TO RELATED APPLICATIONS

This application is a continuation application of PCT International Application No. PCT/CN2020/107392 filed on Aug. 6, 2020, which claims priority to Chinese Patent Application No. 201910741802.0 filed in China on Aug. 12, 2019, which are incorporated in their entireties by reference herein.

TECHNICAL FIELD

The present disclosure relates to the field of communications technologies, and in particular, to a data receiving method, a data sending method, a terminal, and a network device.

BACKGROUND

In a related technology, based on early data transmission (EDT), and according to a resource configured by a network device, when a terminal such as user equipment (UE) is idle or inactive, the network device may directly send downlink data to the UE. However, it is not determined how the network device in the related technology sends the downlink data to the idle or inactive UE.

SUMMARY

Embodiments of the present disclosure provide a data receiving method, a data sending method, a terminal, and a network device, to resolve a problem of how a network device in a related technology sends downlink data to an idle or inactive terminal.

To resolve the foregoing technical problem, the embodiments of the present disclosure are implemented as follows:

According to a first aspect, an embodiment of the present disclosure provides a data receiving method, applied to a terminal and including:

receiving a paging message; and when the paging message includes indication information indicating that downlink data of the terminal is to be sent, obtaining the downlink data of the terminal.

According to a second aspect, an embodiment of the present disclosure provides a data sending method, applied to a network device and including:

sending a paging message to a terminal; and when the paging message includes indication information indicating that downlink data of the terminal is to be sent, sending the downlink data of the terminal.

According to a third aspect, an embodiment of the present disclosure provides a terminal, including:

a first receiving module, configured to receive a paging message; and an obtaining module, configured to: when the paging message includes indication information indicating that downlink data of the terminal is to be sent, obtain the downlink data of the terminal.

According to a fourth aspect, an embodiment of the present disclosure provides a network device, including:

a third sending module, configured to send a paging message to a terminal; and a fourth sending module, configured to: when the paging message includes indication information indicating that downlink data of the terminal is to be sent, send the downlink data of the terminal.

According to a fifth aspect, an embodiment of the present invention provides a communication device, including a processor, a memory, and a computer program that is stored in the memory and that can run on the processor, and when the computer program is executed by the processor, steps of the foregoing data receiving method are implemented, or steps of the foregoing data sending method are implemented. The communication device may optionally be a terminal or a network device.

According to a sixth aspect, an embodiment of the present disclosure provides a computer-readable storage medium, where a computer program is stored on the computer-readable storage medium, and when the computer program is executed by a processor, steps of the foregoing data receiving method are implemented, or steps of the foregoing data sending method are implemented.

In the embodiments of the present disclosure, a paging message is received, and when the paging message includes indication information indicating that downlink data of a terminal is to be sent, the downlink data of the terminal is obtained, so that when the terminal is in an idle state or an inactive state, a network device directly sends corresponding downlink data to the terminal, thereby reducing a sending delay of the downlink data.

BRIEF DESCRIPTION OF DRAWINGS

To describe the technical solutions of the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other accompanying drawings from these accompanying drawings without creative efforts.

DESCRIPTION OF EMBODIMENTS

Figure 1:
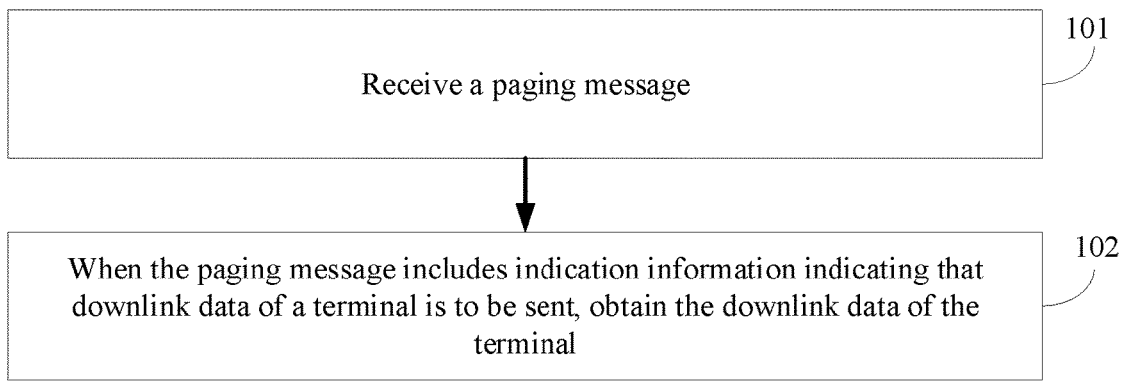
FIG. 1 is a flowchart of a data receiving method according to an embodiment of the present disclosure.

To describe the technical solutions of the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other accompanying drawings from these accompanying drawings without creative efforts.

The technology described in the present disclosure is not limited to a Long Term Evolution LTE) system or an LTE-advanced (LTE-A) system, and may also be used in various wireless communications systems, for example, Code Division Multiple Access (CDMA), Time Division Multiple Access (TDMA), Frequency Division Multiple Access (FDMA), Orthogonal Frequency Division Multiple Access (OFDMA), Single-carrier Frequency Division Multiple Access (SC-FDMA), and another system. The terms "system" and "network" are often exchanged in use. A CDMA system may implement a radio technology such as CDMA 2000 or Universal Terrestrial Radio Access (UTRA). UTRA includes wideband CDMA (Wideband Code Division Multiple Access, WCDMA) and another CDMA variation. A TDMA system may implement a radio technology such as Global System for Mobile Communication (GSM). An OFDMA system may implement radio technologies such as Ultra Mobile Broadband (UMB), Evolution-UTRA (E-UTRA), IEEE 802.11 (Wireless Fidelity (Wi-Fi)), IEEE 802.16 (Worldwide Interoperability for Microwave Access (WiMAX)), IEEE 802.20, and Flash-OFDM. UTRA and E-UTRA are parts of a universal mobile telecommunications system (UTMS). LTE and advanced LTE (for example, LTE-A) are new UMTS versions that use E-UTRA. UTRA, E-UTRA, UMTS, LTE, LTE-A, and GSM are described in a document of an organization named "3rd Generation Partnership Project" (3GPP). CDMA 2000 and UMB are described in a document of an origination named "3rd Generation Partnership Project 2" (3GPP2). The technology described in the present disclosure may also be used in the foregoing system and radio technology, and may also be used in another system and radio technology.

In the embodiments of the present disclosure, a wireless communications system includes a terminal and a network device. The terminal may also be referred to as a terminal device or user equipment (UE). The terminal may be a terminal-side device such as a mobile phone, a tablet personal computer, a laptop computer, a personal digital assistant (PDA), a mobile internet device (MID), a wearable device, or an in-vehicle device. It should be noted that a specific type of the terminal is not limited in the embodiments of the present disclosure. The network device may be a base station or a core network. The base station may be a fifth generation ($5^{th}$ generation, 5G) base station and later versions (for example, a next generation node base station (gNB) or a 5G New Radio (NR) node base station (NB)), or a base station (for example, an eNB, a wireless local area network (WLAN) access point, or another access point) in another communications system. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access node, a WiFi node, or another proper term in the art provided that a same technical effect is achieved. This is not limited to specific technical terms.

To facilitate understanding of the embodiments of the present disclosure, a paging message is first described as follows.

Specifically, content of the paging message mainly includes: indicating update to system information and indicating service arrival of a terminal (UE). When the terminal is in an IDLE or INACTIVE state, a paging message may be received in a discontinuous reception (DRX) manner. Information about a location at which the terminal receives the paging message may include:

(1) Paging frame (PF): The PF is a radio frame number, and may include one or more paging occasions (PO).

(2) PO: The PO is a subframe number. In the PO, a paging message may be scheduled by using a paging radio network temporary identity (P-RNTI) in a physical downlink control channel (PDCCH).

Locations of the PF and the PO may be obtained by the terminal through calculation according to an identifier UE-ID (such as an international mobile subscriber identity (IMSI)) of the terminal. A DRX cycle for receiving the paging message by the terminal may be determined by the shortest one of a broadcast paging cycle in system information and a terminal-specific paging cycle.

When a network device sends a paging message in a beam scanning manner, for each paging cycle, the network device may send multiple synchronous signal block (SSB) signals (or referred to as SSB burst). Each SSB is associated with one paging listening location, and receives the paging message at a specific paging listening location corresponding to a specific SSB. For example, the network device broadcasts SSB 1, SSB 2, and SSB 3 that correspond to a physical downlink control channel (PDCCH) listening occasion 1, a PDCCH listening occasion 2, and a PDCCH listening occasion 3 for paging. When the UE detects the SSB 1 at a PO location of the UE, the UE receives scheduling information of a paging message on the PDCCH listening opportunity 1 corresponding to the SSB 1, and receives the paging message by using the received scheduling information.

FIG. 1 is a flowchart of a data receiving method according to an embodiment of the present disclosure. The method is applied to a terminal. As shown in FIG. 1, the method includes the following steps.

Step 101: Receive a paging message.

Step 102: When the paging message includes indication information indicating that downlink data of a terminal is to be sent, obtain the downlink data of the terminal.

It should be noted that the terminal in this embodiment may be in an idle state or an inactive state. The paging message may be a specific paging message, and configuration information different from that for a paging message in a related technology is used. The downlink data may be data radio bearer (DRB) data.

Optionally, the indication information indicating that the downlink data of the terminal is sent may be identification information of the terminal, for example, I-RNTI or ng-5G-S-TMSI, or may be 1-bit indication information. When the indication information is 1, it indicates that the downlink data of the terminal is sent.

Optionally, the paging message may be identified by identification information indicating that downlink data is sent. For example, the identification information may be P-Data-RNTI, and a corresponding paging message is scheduled and sent by using scheduling information identified by the P-Data-RNTI.

Optionally, to implement normal receiving of the paging message and the corresponding downlink data, before step 101, the terminal may further receive paging message configuration information from the network device and configuration information for receiving downlink data associated with the paging message configuration information. For example, the UE receives system information SIB 8 of a cell 1, where the SIB 8 includes specific paging message configuration information (for example, pagingForDataConfig) and configuration information (for example, dataConfig) for receiving downlink data associated with the specific paging message configuration information. It may be understood that the specific paging message configuration information is different from common paging message configuration information (for example, pagingConfig) that is not used for data sending in a related technology.

Optionally, the configuration information for receiving the downlink data includes at least one of the following:

indication information indicating whether to associate to-be-sent downlink data by using the paging message; where for example, the indication information may optionally be 1 bit, and a value is 0 or 1; when the value is 1, it indicates that the paging message and the downlink data are sent in a same MAC PDU, and when the value is 0, it indicates that the paging message and the downlink data are not sent in a same MAC PDU; and identification information of the paging message. It should be noted that the identification information of the paging message refers to identification information of a specific paging message in this embodiment, for example, P-Data-RNTI, which is different from identification information (such as P-RNTI) that is not used for data sending in a related technology.

To help the terminal obtain the corresponding downlink data through decoding, before obtaining the downlink data, the terminal may further restore the configuration information used by the terminal to receive the downlink data. For example, the configuration information used for receiving the downlink data may be a security algorithm, a security key, DRB configuration information, or the like.

In the data receiving method in this embodiment of the present disclosure, a paging message is received, and when the paging message includes indication information indicating that downlink data of a terminal is to be sent, the downlink data of the terminal is obtained, so that when the terminal is in an idle state or an inactive state, a network device directly sends corresponding downlink data to the terminal, thereby reducing a sending delay of the downlink data.

In this embodiment of the present disclosure, to enable the network device to learn a data receiving status of the terminal, after obtaining the downlink data, the terminal may further send feedback information to the network device. The feedback information may include but is not limited to at least one of the following:

indication information indicating whether the downlink data is successfully received; where for example, the indication information may be fed back by using any one of the following: hybrid automatic repeat request (HARQ) acknowledgement (ACK) information, a physical random access channel (PRACH) resource, or scheduling request (SR) information of a physical uplink control channel (PUCCH); and indication information indicating whether uplink data is sent. For example, the indication information may be fed back to a network side by sending buffer status report (BSR) information.

Optionally, a sending resource of the foregoing feedback information may be indicated by the network device, and an indication manner may include either of the following:

indicated by using indication information in the paging message; where for example, configuration information of the sending resource of the feedback information is delivered in the paging message; and indicated by system information; where for example, a sending resource of feedback information corresponding to downlink data receiving is indicated in system information.

In this embodiment of the present disclosure, the downlink data of the terminal may be sent at the same time as the paging message, or may be sent at a downlink data sending location associated with the paging message. In other words, the downlink data of the terminal and the paging message are separately sent. Separate descriptions are as follows:

Case 1

In the case 1, the downlink data of the terminal and the paging message may be sent simultaneously in a same media access control (MAC) protocol data unit (PDU). The MAC PDU may be transmission content in a physical downlink shared channel (PDSCH), that is, the downlink data of the terminal and the paging message may be simultaneously in a same PDSCH.

In the case 1, to implement normal receiving of the paging message and the corresponding downlink data, before step 101, the terminal may further receive paging message configuration information from the network device and configuration information for receiving downlink data associated with the paging message configuration information. For example, the UE receives system information SIB 8 of a cell 1, where the SIB 8 includes specific paging message configuration information (for example, pagingForDataConfig) and configuration information (for example, dataConfig) for receiving downlink data associated with the specific paging message configuration information. It may be understood that the specific paging message configuration information is different from common paging message configuration information (for example, pagingConfig) that is not used for data sending in a related technology.

Optionally, the configuration information for receiving the downlink data includes at least one of the following:

indication information indicating whether to associate to-be-sent downlink data by using the paging message; where for example, the indication information may optionally be 1 bit, and a value is 0 or 1; when the value is 1, it indicates that the paging message and the downlink data are sent in a same MAC PDU, and when the value is 0, it indicates that the paging message and the downlink data are not sent in a same MAC PDU; and identification information of the paging message. It should be noted that the identification information of the paging message refers to identification information of a specific paging message in this embodiment, for example, P-Data-RNTI, which is different from identification information (such as P-RNTI) that is not used for data sending in a related technology.

In this way, by using the configuration information for receiving the downlink data, the terminal may receive the corresponding downlink data by using the paging message.

It should be noted that in this embodiment, to send the downlink data to the terminal in an INACTIVE or IDLE state, to ensure that the terminal receives data, the network device may further send configuration information to the terminal, where the configuration information is used to instruct the terminal to store the configuration information for receiving the downlink data in the INACTIVE or IDLE state. The configuration information for receiving the downlink data may include at least one of the following: a DRB identifier (for example, the downlink data of the UE is sent by using a DRB 1) for receiving the downlink data and indication information (for example, the downlink data of the UE is carried in a downlink radio resource control (RRC) message) for receiving the downlink data by using control plane signaling.

In an implementation, when UE 1 is in a connected state, a base station 1 may send an RRC release message to the UE 1, to instruct the UE 1 to enter the INACTIVE state, and instruct the UE to store the configuration information used for receiving the downlink data.

In the case 1, the obtaining the downlink data of the terminal in step 102 may include:

obtain, through decoding based on a preset data format, the downlink data of the terminal from a MAC PDU that sends the paging message; where the preset data format may optionally be either of the following:

a data format 1: the MAC PDU includes downlink data of one terminal; for example, the MAC PDU includes downlink data of only one terminal; and a data format 2: the MAC PDU includes downlink data of multiple terminals.

Figure 2A:
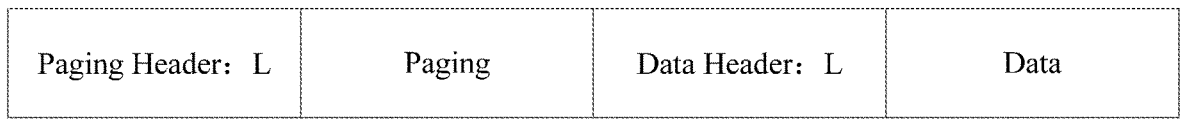
FIG. 2A is a schematic diagram of a data format 1 according to an embodiment of the present disclosure.

For the data format 1, referring to FIG. 2A. The downlink data of the terminal may be arranged after the paging message (Paging). In addition, as shown in FIG. 2A, the data format 1 may further additionally include the following content:

(1) a paging message header (such as Paging Header) corresponding to the paging message, where the paging message header may include indication information indicating a length of the corresponding paging message; for example, a length L of the paging message that is indicated by the indication information may be equal to 10 bytes; and (2) a data header (for example, Data Header) corresponding to terminal data, where the data header may include indication information indicating a length of the corresponding terminal data; for example, a length L of the corresponding terminal data that is indicated by the indication information may be equal to 10 bytes.

Figure 2B:
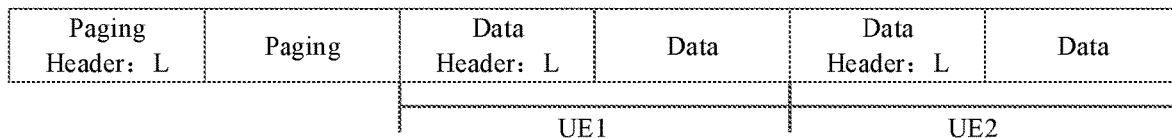
FIG. 2B is a first schematic diagram of a data format 1 according to an embodiment of the present disclosure.
Figure 2C:
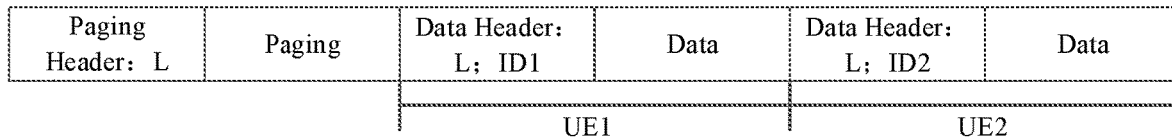
FIG. 2C is a second schematic diagram of a data format 1 according to an embodiment of the present disclosure.

For the data format 2, referring to FIG. 2B and FIG. 2C. The downlink data of the multiple terminals may be arranged in a terminal sequence indicated in the paging message (Paging) (the terminal sequence may be a sequence identified by the terminal). For example, as shown in FIG. 2B, if the paging message indicates that a UE identifier indicating that data is sent includes UE 1 and UE 2, the paging message is followed by data of the UE 1, and the data of the UE 1 is followed by data of the UE 2.

In addition, as shown in FIG. 2B, the data format 2 may further additionally include the following content:

(1) a paging message header (such as Paging Header) corresponding to the paging message, where the paging message header may include indication information indicating a length of the corresponding paging message; for example, a length L of the paging message that is indicated by the indication information may be equal to 10 bytes; and (2) a data header (for example, Data Header) corresponding to terminal data, where the data header may include indication information indicating a length of the corresponding terminal data; for example, a length L of the corresponding terminal data that is indicated by the indication information may be equal to 10 bytes.

Alternatively, as shown in FIG. 2C, the data format 2 may further additionally include the following content:

(1) a paging message header (such as Paging Header) corresponding to the paging message, where the paging message header may include indication information indicating a length of the corresponding paging message; for example, a length L of the paging message that is indicated by the indication information may be equal to 10 bytes; and (2) a data header (for example, Data Header) corresponding to terminal data, where the data header may include indication information indicating a length of the corresponding terminal data (for example, a length L of the terminal data indicated by the indication information may be equal to 10 bytes) and terminal identifier indication information (or referred to as terminal identification information), as shown in an ID 1 and an ID 2 in FIG. 2C. The ID1 is, for example, a logical channel 1, and corresponds to a UE-ID-1 in the paging message. The ID 2 is, for example, a logical channel 2, and corresponds to a UE-ID-2 in the paging message.

It should be noted that the foregoing terminal identifier may be an implicit indication or an explicit indication. For implicit indication, terminal identification information may be any one of the following: a truncated part of the terminal identification information, identification information obtained through calculation based on the terminal identifier, or logical channel identifier information corresponding to the terminal identifier (for example, a terminal identifier indicated by the first indication in the paging message corresponds to a logical channel identifier 1, or a terminal identifier indicated by the second indication in the paging message corresponds to a logical channel identifier 2). For explicit indication, the terminal identification information directly indicates the terminal identifier.

In an implementation, for UE that has received the paging message configuration information and the configuration information for receiving the downlink data associated with the paging message configuration information, when the UE needs to receive the downlink data, the UE may monitor sending of the paging message (that is, a specific paging message in this embodiment), for example, obtain scheduling information of the paging message by monitoring a PDCCH of the P-Data-RNTI. If the UE learns, through listening, that the PDCCH of the P-Data-RNTI schedules sending of the paging message, the UE may receive the paging message. Further, if the paging message includes a UE identifier (such as I-RNTI or ng-5G-S-TMSI) or indication information indicating that downlink data of the UE is received, the UE decodes downlink data corresponding to the UE.

Case 2

In the case 2, the downlink data of the terminal may be sent by using a downlink resource (for example, a physical downlink shared channel (PDSCH) channel) associated with the paging message).

In the case 2, to implement normal receiving of the paging message and the corresponding downlink data, before step 101, the terminal may further receive paging message configuration information from the network device and configuration information for receiving downlink data associated with the paging message configuration information. For example, the UE receives system information SIB 8 of a cell 1, where the SIB 8 includes specific paging message configuration information (for example, pagingForDataConfig) and configuration information (for example, dataConfig) for receiving downlink data associated with the specific paging message configuration information. It may be understood that the specific paging message configuration information is different from common paging message configuration information (for example, pagingConfig) that is not used for data sending in a related technology.

Optionally, the configuration information for receiving the downlink data includes at least one of the following:

resource configuration information for sending the downlink data; and identification information for sending the downlink data.

In an implementation, for the resource configuration information for sending the downlink data, a resource location of paging message scheduling information may be a subframe 1 in a cycle of 10 ms, and a resource location of corresponding downlink data scheduling information may be a subframe 2 in the cycle of 10 ms. In this way, in the subframe 2, the terminal may receive the downlink data scheduling information, and receive the downlink data based on the received downlink data scheduling information.

In another implementation, for the resource configuration information for sending the downlink data, a resource location of paging message scheduling information may be one PO (Paging Occasion) in a cycle of 10 ms, and in the PO, S PDCCH monitoring locations correspond to S transmitted SSBs in one SSB burst, and a PDCCH monitoring locations of the $K^{th}$ paging in the S PDCCH monitoring locations in the PO corresponds to the $K^{th}$ transmitted SSB. Even further, the S transmitted SSBs in the one SSB burst correspond to S sending scheduling information sending locations for S pieces of downlink data, and a PDCCH monitoring location of the $K^{th}$ downlink data corresponds to the $K^{th}$ transmitted SSB. For example, in one PO of the UE 1, three PDCCH monitoring locations correspond to three SSBs, and the three SSBs correspond to PDCCH monitoring locations of three pieces of downlink data. When the UE 1 detects an SSB-1 in a downlink, the UE 1 may receive the paging message at a location of a PDCCH (paging)-1, and receive the downlink data at the location of the PDCCH (data)-1.

In another implementation, identification information for sending the downlink data may be an identifier of PDCCH scheduling information of the downlink data, for example, Data-RNTI. The PDCCH scheduling information of the downlink data may have multiple identifiers, for example, multiple Data-RNTIs. For multiple UEs that are indicated in the paging message and that send downlink data, different UEs may correspond to identification information for sending different downlink data. For example, identification information for sending multiple pieces of downlink data is sequentially allocated in an arrangement sequence of the multiple UEs that are indicated in the paging message and that send downlink data. For example, an arrangement sequence of the identification information for sending the downlink data indicated in a system message is: Data-RNTI-1; Data-RNTI-2. Identification information of UEs that are indicated in the paging message and that send data is arranged in the following sequence: UE-ID-1; UE-ID-2. In this case, identification information for sending downlink data corresponding to UE-ID-1 is Data-RNTI-1, and identification information for sending downlink data corresponding to UE-ID-2 is Data-RNTI-2.

It should be noted that in this embodiment, to send the downlink data to the terminal in an INACTIVE or IDLE state, to ensure that the terminal receives data, the network device may further send configuration information to the terminal, where the configuration information is used to instruct the terminal to store the configuration information for receiving the downlink data in the INACTIVE or IDLE state. The configuration information for receiving the downlink data may include at least one of the following: a DRB identifier (for example, the downlink data of the UE is sent by using a DRB 1) for receiving the downlink data and indication information (for example, the downlink data of the UE is carried in a downlink RRC message) for receiving the downlink data by using control plane signaling.

In an implementation, when UE 1 is in a connected state, a base station 1 may send an RRC release message to the UE 1, to instruct the UE 1 to enter the INACTIVE state, and instruct the UE to store the configuration information used for receiving the downlink data.

In the case 2, the obtaining the downlink data of the terminal in step 102 may include:

receiving the downlink data of the terminal at a downlink data receiving location associated with the paging message.

It may be understood that for same downlink data, a downlink data sending location and a downlink data receiving location are a same location, and different statements are used for different relative bodies. It is a downlink data sending location for the network device, and is a downlink data receiving location for the terminal.

Optionally, when downlink data of multiple terminals is received at the downlink data receiving location associated with the paging message, the receiving the downlink data of the terminal may include:

receiving, by using either of the following information, the downlink data of the terminal at the downlink data receiving location associated with the paging message:

identification information for distinguishing downlink data of different terminals; where for example, if scheduling information of downlink data of both UE-1 and UE-2 is sent in a slot-1, Data-RNTI-1 is used to send downlink data scheduling information of the UE-1, and Data-RNTI-2 is used to send downlink data scheduling information of the UE-2. In other words, different UE data is distinguished by using different identifiers; and a preset data packet format for distinguishing downlink data of different terminals.

Optionally, the preset data packet format may be either of the following:

a data packet format 1: a data header of data of each terminal includes terminal identification information; and a data packet format 2: data of terminals is arranged in a terminal sequence indicated in the paging message.

Figure 3A:
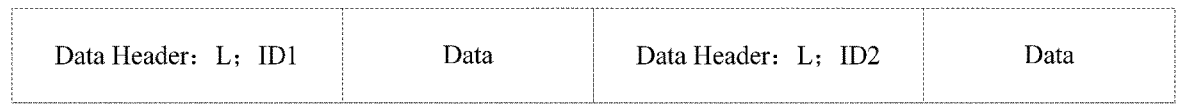
FIG. 3A is a first schematic diagram of a preset data packet format according to an embodiment of the present disclosure.

For the data packet format 1, refer to FIG. 3A. A data header (for example, Data Header) corresponding to data of each terminal, where the data header may be referred to as a data packet header, and the data header may include indication information indicating a length of the corresponding terminal data (for example, a length L of the terminal data indicated by the indication information may be equal to 10 bytes) and terminal identifier indication information, as shown in an ID 1 and an ID 2 in FIG. 3A. The IDI is, for example, a logical channel 1, and corresponds to a UE-ID-1 in the paging message. The ID 2 is, for example, a logical channel 2, and corresponds to a UE-ID-2 in the paging message.

It should be noted that the foregoing terminal identification information may be an implicit indication or an explicit indication. For implicit indication, the terminal identification information may be any one of the following: a truncated part of terminal identification information, identification information obtained through calculation based on the terminal identification information, a numbering sequence for identifiers of terminals that are indicated in the paging message and that send data (for example, an identifier of the first terminal that is indicated in the paging message and that sends data is a value 1, an identifier of the second terminal that is indicated in the paging message and that sends data is a value 2), and logical channel identifier information corresponding to the terminal identifier (for example, the first terminal identifier indicated in the paging message corresponds to a logical channel identifier 1, and the second terminal identifier indicated in the paging message corresponds to a logical channel identifier 2), and the like. For explicit indication, the terminal identification information directly indicates the terminal identifier.

Figure 3B:
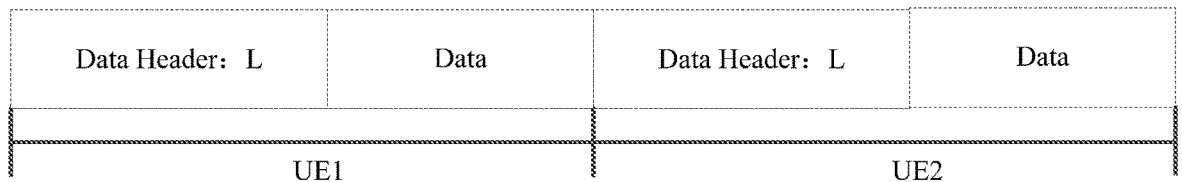
FIG. 3B is a second schematic diagram of a preset data packet format according to an embodiment of the present disclosure.

For the data packet format 2, referring to FIG. 3B, data of each terminal has a corresponding data header (for example, Data Header), and the data header may include indication information indicating a length of the corresponding terminal data. For example, a length L of terminal data indicated by the indication information may be equal to 10 bytes. As shown in FIG. 3B, if identifiers of UEs that are indicated in the paging message and that send data includes UE 1 and UE 2, the first data corresponds to data of the UE 1, and the data of the UE 1 is followed by data of the UE 2.

In the case 2, before step 102, the method may further include:

sending uplink indication information to the network device.

The uplink indication information may indicate a location of the terminal, so that the network device sends the downlink data to the terminal based on the location of the terminal. For example, the uplink indication information may indicate a cell in which the terminal sends the uplink indication information. In this way, when sending the downlink data to the terminal, the network device may send the corresponding downlink data to the terminal by using the cell indicated by the uplink indication information.

Alternatively, the uplink indication information may notify the network device that the paging message is received, so that the network device sends the downlink data to the terminal by using a location (for example, a cell) at which the terminal sends the uplink indication information.

Optionally, a sending resource location of the uplink indication information may be associated with the paging message. For example, if a resource location of the paging message scheduling information is a subframe 1 in a cycle of 10 ms, the resource location of the uplink indication information may be a subframe 2 in the cycle of 10 ms. In this way, in the subframe 2, the terminal may send corresponding uplink indication information. For another example, a resource location of the paging message scheduling information may be one PO (Paging Occasion) in a cycle of 10 ms, and in the PO, S PDCCH monitoring locations correspond to S transmitted SSBs in one SSB burst, and a PDCCH monitoring locations of the $K^{th}$ paging in the S PDCCH monitoring locations in the PO corresponds to the $K^{th}$ transmitted SSB. Even further, the S transmitted SSBs in the one SSB burst correspond to S sending scheduling information sending locations, and the $K^{th}$ piece of uplink indication information sending location corresponds to the $K^{th}$ transmitted SSB. For example, in one PO of the UE 1, three PDCCH monitoring locations correspond to three SSBs, and the three SSBs correspond to three uplink indication information sending locations. When the UE 1 detects an SSB-1 in a downlink, the UE 1 may receive the paging message at a location of a PDCCH (paging)-1, and send the uplink indication information at a location of PRACH (data)-1.

Optionally, a channel corresponding to the uplink indication information may be any one of the following:

a physical random access channel (PRACH);

a physical uplink shared channel (PUSCH);

a physical uplink control channel PUCCH); and a sounding reference Signal (SRS).

Optionally, the foregoing uplink indication information may include identification information of the terminal, so that the network device distinguishes different terminals. For example, the PUSCH includes an I-RNTI identifier of the terminal. For another example, an uplink PRACH resource corresponding to the first terminal identifier that is indicated in the paging message to have downlink data transmission is PRACH-1 (in other words, a terminal identifier is associated with a sending resource of the uplink indication information, to implicitly indicate the terminal identifier).

Figure 4:
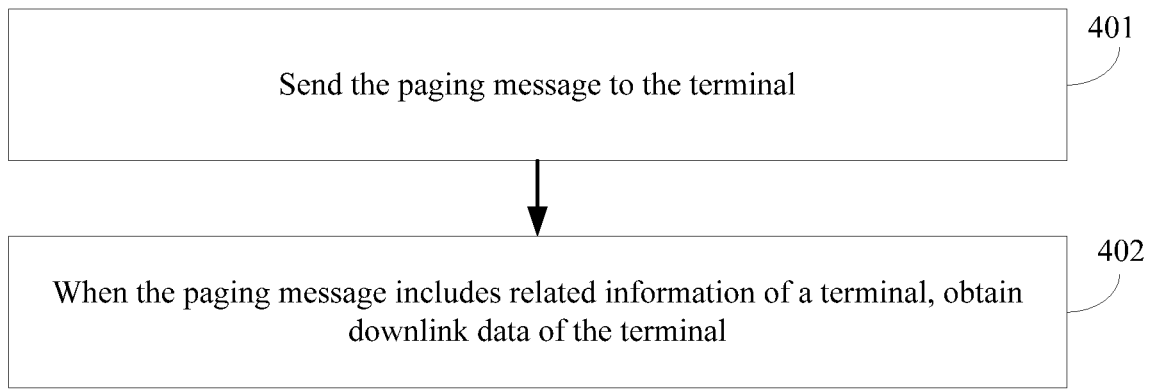
FIG. 4 is a flowchart of a data sending method according to an embodiment of the present disclosure.

FIG. 4 is a flowchart of a data sending method according to an embodiment of the present disclosure. The method is applied to a network device. As shown in FIG. 4, the method includes the following steps.

Step 401: Send a paging message to a terminal.

Step 402: When the paging message includes indication information indicating that downlink data of a terminal is to be sent, send the downlink data of the terminal.

It should be noted that the terminal in this embodiment may be in an idle state or an inactive state. The paging message may be a specific paging message, and configuration information different from that for a paging message in a related technology is used. The downlink data may be data radio bearer (DRB) data.

Optionally, the indication information indicating that the downlink data of the terminal is sent may be identification information of the terminal, for example, I-RNTI or ng-5G-S-TMSI, or may be 1-bit indication information. When the indication information is 1, it indicates that the downlink data of the terminal is sent.

In this embodiment of the present disclosure, when the terminal is in an idle state or an inactive state, the network device directly sends the corresponding downlink data to the terminal, thereby reducing a sending delay of the downlink data.

Optionally, the sending the downlink data of the terminal in step 402 may include:

send the downlink data of the terminal based on a preset data format in a MAC PDU that sends the paging message.

Optionally, the preset data format may be either of the following:

a data format 1: the MAC PDU includes downlink data of one terminal;

a data format 2: the MAC PDU includes downlink data of multiple terminals.

For specific forms of the data format 1 and the data format 2, refer to descriptions in FIG. 2A to FIG. 2C. Details are not described herein again.

Optionally, before step 401, the method may further include:

sending, to the terminal, paging message configuration information and configuration information for receiving downlink data associated with the paging message configuration information; where the configuration information for receiving the downlink data includes at least one of the following:

indication information indicating whether to associate to-be-sent downlink data by using the paging message; where identification information of the paging message.

Optionally, the sending the downlink data of the terminal in step 402 may include:

send the downlink data of the terminal at a downlink data sending location associated with the paging message.

Optionally, before step 401, the method may further include:

sending, to the terminal, paging message configuration information and configuration information for receiving downlink data associated with the paging message configuration information; where the configuration information for receiving the downlink data includes at least one of the following:

resource configuration information for sending the downlink data; and identification information for sending the downlink data.

Optionally, before step 402, the method may further include:

receiving uplink indication information from the terminal.

Further, step 402 may include: send, based on the uplink indication information, the downlink data of the terminal at the downlink data sending location associated with the paging message.

The uplink indication information may indicate a location of the terminal, so that the network device sends the downlink data to the terminal based on the location of the terminal. For example, the uplink indication information may indicate a cell in which the terminal sends the uplink indication information. In this way, when sending the downlink data to the terminal, the network device may send the corresponding downlink data to the terminal by using the cell indicated by the uplink indication information.

Alternatively, the uplink indication information may notify the network device that the paging message is received, so that the network device sends the downlink data to the terminal by using a location (for example, a cell) at which the terminal sends the uplink indication information.

Optionally, a sending resource location of the uplink indication information is associated with the paging message.

Optionally, the uplink indication information includes identification information of the terminal.

Optionally, when downlink data of multiple terminals is sent at the downlink data sending location associated with the paging message, step 402 may include:

sending, by using any one of the following information, the downlink data of the terminal at the downlink data sending location associated with the paging message:

identification information for distinguishing downlink data of different terminals; and a preset data packet format for distinguishing downlink data of different terminals.

Optionally, the preset data packet format is either of the following:

a packet header of a data packet of each terminal includes terminal identification information; and data packets of terminals are arranged in a terminal sequence indicated in the paging message.

Optionally, after step 402, the method further includes:

receiving feedback information from the terminal; where the feedback information includes at least one of the following:

indication information indicating whether the downlink data is successfully received; and indication information indicating whether uplink data is sent.

The foregoing embodiments describe the data receiving method and the data sending method in the present disclosure, and the following describes a terminal and a network device in the present disclosure with reference to embodiments and the accompanying drawings.

Figure 5:
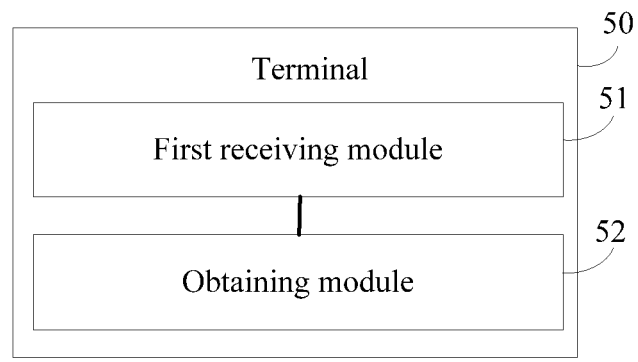
FIG. 5 is a first schematic diagram of a structure of a terminal according to an embodiment of the present disclosure.

FIG. 5 is a schematic structural diagram of a terminal according to an embodiment of the present disclosure. As shown in FIG. 5, a terminal 50 includes:

a first receiving module 51, configured to receive a paging message; and an obtaining module 52, configured to: when the paging message includes indication information indicating that downlink data of the terminal is to be sent, obtain the downlink data of the terminal.

In this embodiment of the present disclosure, a paging message is received, and when the paging message includes indication information indicating that downlink data of a terminal is to be sent, the downlink data of the terminal is obtained, so that when the terminal is in an idle state or an inactive state, a network device directly sends corresponding downlink data to the terminal, thereby reducing a sending delay of the downlink data.

Optionally, the obtaining module 52 is further configured to:

obtain, through decoding based on a preset data format, the downlink data of the terminal from a MAC PDU that sends the paging message.

Optionally, the preset data format may be either of the following:

a data format 1: the MAC PDU includes downlink data of one terminal; and a data format 2: the MAC PDU includes downlink data of multiple terminals.

For specific forms of the data format 1 and the data format 2, refer to descriptions in FIG. 2A to FIG. 2C. Details are not described herein again.

Optionally, the terminal 50 may further include:

a second receiving module, configured to receive, from a network device, paging message configuration information and configuration information for receiving downlink data associated with the paging message configuration information; where the configuration information for receiving the downlink data includes at least one of the following:

indication information indicating whether to associate to-be-sent downlink data by using the paging message; and identification information of the paging message.

Optionally, the obtaining module 52 may further include:

a receiving unit, configured to receive the downlink data of the terminal at a downlink data receiving location associated with the paging message.

Optionally, the terminal 50 may further include:

a third receiving module, configured to receive, from a network device, paging message configuration information and configuration information for receiving downlink data associated with the paging message configuration information; where the configuration information for receiving the downlink data includes at least one of the following:

resource configuration information for sending the downlink data; and identification information for sending the downlink data.

Optionally, the terminal 50 may further include:

a first sending module, configured to send indication information to the network device.

Optionally, a sending resource location of the uplink indication information is associated with the paging message.

Optionally, the uplink indication information includes identification information of the terminal.

Optionally, a channel corresponding to the uplink indication information may be any one of the following:

PRACH, PUSCH, PUCCH, and SRS.

Optionally, the obtaining module 52 is further configured to: when downlink data of multiple terminals is received at a downlink data receiving location associated with the paging message, receive, by using either of the following information, the downlink data of the terminal at a downlink data receiving location associated with the paging message:

identification information for distinguishing downlink data of different terminals; and a preset data packet format for distinguishing downlink data of different terminals.

Optionally, the preset data packet format is either of the following:

a packet header of a data packet of each terminal includes terminal identification information; and data packets of terminals are arranged in a terminal sequence indicated in the paging message.

Optionally, the terminal 50 may further include:

a processing module, configured to restore configuration information that is used by the terminal to receive the downlink data.

Optionally, the terminal 50 may further include:

a second sending module, configured to send feedback information to the network device; where the feedback information includes at least one of the following:

indication information indicating whether the downlink data is successfully received; and indication information indicating whether uplink data is sent.

Optionally, a sending resource indication manner of the feedback information includes either of the following:

indicated by using indication information in the paging message; and indicated by system information.

Optionally, the paging message is identified by identification information indicating that downlink data is sent.

Figure 6:
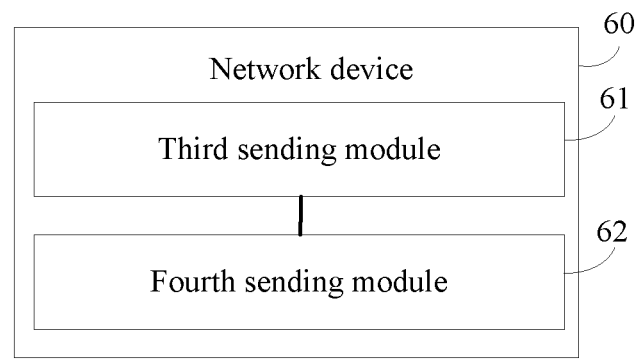
FIG. 6 is a first schematic diagram of a structure of a network device according to an embodiment of the present disclosure.

FIG. 6 is a schematic structural diagram of a network device according to an embodiment of the present disclosure. As shown in FIG. 6, a network device 60 includes:

a third sending module 61, configured to send a paging message to a terminal; and a fourth sending module 62, configured to: when the paging message includes indication information indicating that downlink data of the terminal is to be sent, send the downlink data of the terminal.

In this embodiment of the present disclosure, when the terminal is in an idle state or an inactive state, the network device directly sends the corresponding downlink data to the terminal, thereby reducing a sending delay of the downlink data.

Optionally, the fourth sending module 62 is configured to:

send the downlink data of the terminal based on a preset data format in a MAC PDU that sends the paging message.

Optionally, the preset data format may be either of the following:

a data format 1: the MAC PDU includes downlink data of one terminal; and a data format 2: the MAC PDU includes downlink data of multiple terminals.

For specific forms of the data format 1 and the data format 2, refer to descriptions in FIG. 2A to FIG. 2C. Details are not described herein again.

Optionally, the network device 60 may further include:

a fifth sending module, configured to send, to the terminal, paging message configuration information and configuration information for receiving downlink data associated with the paging message configuration information; where the configuration information for receiving the downlink data includes at least one of the following:

indication information indicating whether to associate to-be-sent downlink data by using the paging message; and identification information of the paging message.

Optionally, the fourth sending module 62 is configured to:

send the downlink data of the terminal at a downlink data sending location associated with the paging message.

Optionally, the network device 60 may further include:

a sixth sending module, configured to send, to the terminal, paging message configuration information and configuration information for receiving downlink data associated with the paging message configuration information; where the configuration information for receiving the downlink data includes at least one of the following:

resource configuration information for sending the downlink data; and identification information for sending the downlink data.

Optionally, the network device 60 may further include:

a fourth receiving module, configured to receive uplink indication information from the terminal.

Further, the fourth sending module 62 is configured to:

send, based on the uplink indication information, the downlink data of the terminal at the downlink data sending location associated with the paging message.

Optionally, a sending resource location of the uplink indication information is associated with the paging message.

Optionally, the uplink indication information includes identification information of the terminal.

Optionally, the fourth sending module 62 is configured to: when downlink data of multiple terminals is received at a downlink data sending location associated with the paging message, send, by using either of the following information, the downlink data of the terminal at the downlink data receiving location associated with the paging message:

identification information for distinguishing downlink data of different terminals; and a preset data packet format for distinguishing downlink data of different terminals.

Optionally, the preset data packet format is either of the following:

a packet header of a data packet of each terminal includes terminal identification information; and data packets of terminals are arranged in a terminal sequence indicated in the paging message.

Optionally, the network device 60 may further include:

a fifth receiving module, configured to receive feedback information from the terminal; where the feedback information includes at least one of the following:

indication information indicating whether the downlink data is successfully received; and indication information indicating whether uplink data is sent.

An embodiment of the present disclosure further provides a communication device, including a processor, a memory, and a computer program that is stored in the memory and that runs on the processor. When the computer program is executed by the processor, processes of the data receiving method embodiment shown in FIG. 1 can be implemented, or processes of the data sending method embodiment shown in FIG. 4 can be implemented, and a same technical effect can be achieved. To avoid repetition, details are not described herein again. The communication device may optionally be a terminal or a network device.

Figure 7:
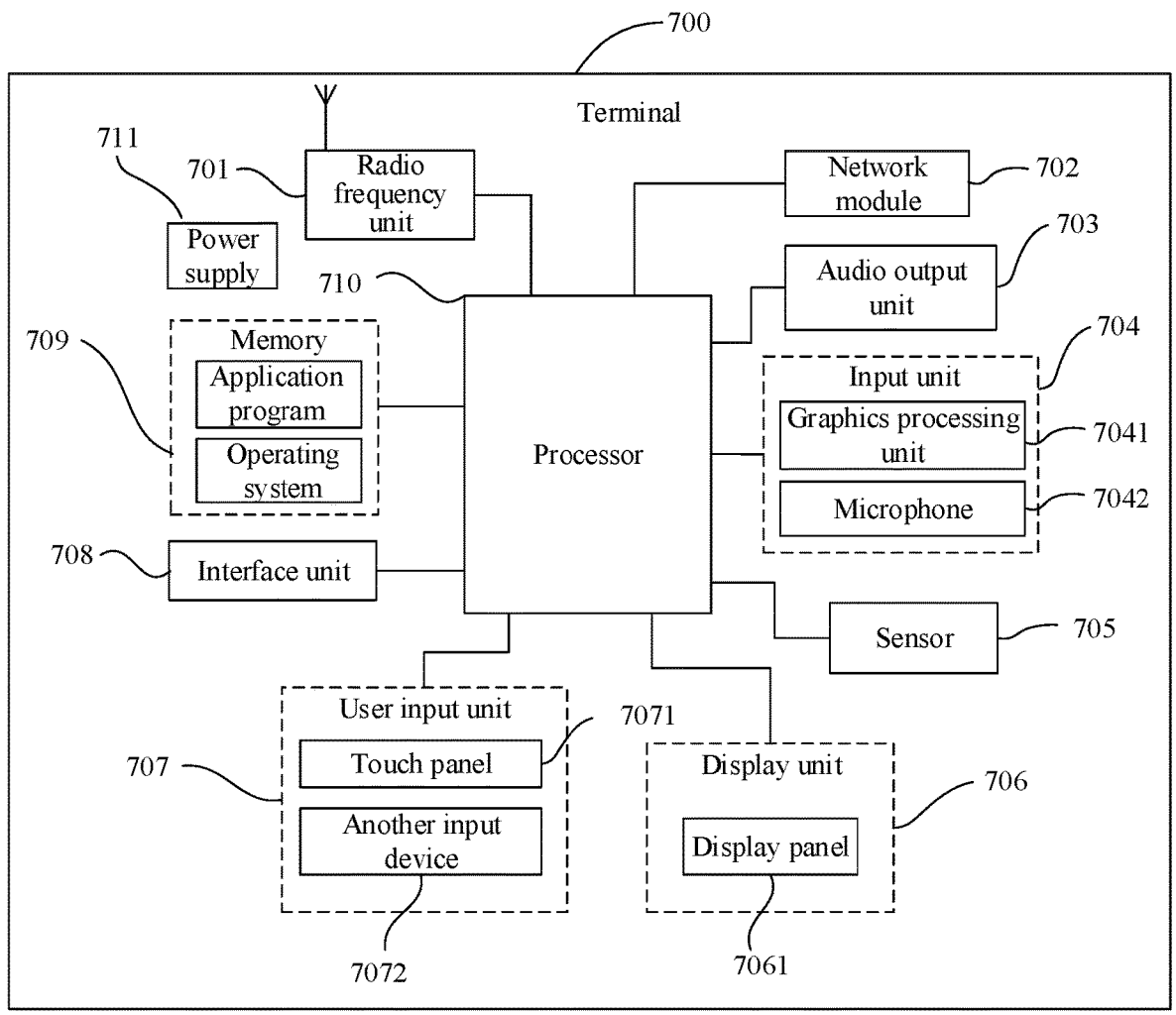
FIG. 7 is a second schematic diagram of a structure of a terminal according to an embodiment of the present disclosure.

FIG. 7 is a schematic diagram of a hardware structure of a terminal for implementing embodiments of the present disclosure. The terminal 700 includes but is not limited to components such as a radio frequency unit 702, a network module 701, an audio output unit 703, an input unit 704, a sensor 705, a display unit 706, a user input unit 707, an interface unit 708, a memory 709, a processor 710, and a power supply 711. A person skilled in the art may understand that a structure of the terminal shown in FIG. 7 does not constitute a limitation on the terminal, and the terminal may include more or fewer components than those shown in the figure, or combine some components, or have different component arrangements. In this embodiment of the present disclosure, the terminal includes but is not limited to a mobile phone, a tablet computer, a laptop computer, a palmtop computer, an in-vehicle terminal, a wearable device, a pedometer, and the like.

The radio frequency unit 701 is configured to receive a paging message.

The processor 710 is configured to: when the paging message includes indication information indicating that downlink data of the terminal is to be sent, obtain the downlink data of the terminal.

It may be understood that the terminal 700 in this embodiment of the present disclosure may implement processes implemented in the foregoing method embodiment shown in FIG. 1 and achieve a same beneficial effect. To avoid repetition, details are not described herein again.

It should be understood that, in this embodiment of the present disclosure, the radio frequency unit 701 may be configured to receive and send information or receive and send a signal in a call process. Specifically, after downlink data from a base station is received, the processor 710 processes the downlink data. In addition, uplink data is sent to the base station. Generally, the radio frequency unit 701 includes but is not limited to an antenna, at least one amplifier, a transceiver, a coupler, a low noise amplifier, a duplexer, and the like. In addition, the radio frequency unit 701 may further communicate with a network and another device by using a wireless communication system.

The terminal provides wireless broadband Internet access for a user by using a network module 702, for example, helping the user send and receive an email, browsing a web page, and accessing streaming media.

The audio output unit 703 may convert audio data received by the radio frequency unit 701 or the network module 702 or stored in the memory 709 into an audio signal and output as sound. In addition, the audio output unit 703 may further provide audio output (for example, call signal receiving sound or message receiving sound) related to a specific function performed by the terminal 700. The audio output unit 703 includes a loudspeaker, a buzzer, a telephone receiver, and the like.

The input unit 704 is configured to receive an audio or video signal. The input unit 704 may include a graphics processing unit (GPU) 7041 and a microphone 7042. The graphics processing unit 7041 processes image data of a static picture or a video obtained by an image capture apparatus (such as a camera) in a video capture mode or an image capture mode. A processed image frame may be displayed on the display unit 706. The image frame processed by the graphics processing unit 7041 may be stored in the memory 709 (or another storage medium) or sent by using the radio frequency unit 701 or the network module 702. The microphone 7042 may receive sound and can process such sound into audio data. The processed audio data may be output by being converted into a format that may be sent to a mobile communications base station by using the radio frequency unit 701 in a telephone call mode.

The terminal 700 further includes at least one sensor 705, such as an optical sensor, a motion sensor, and another sensor. Specifically, the optical sensor includes an ambient light sensor and a proximity sensor. The ambient light sensor may adjust luminance of the display panel 7061 based on brightness of ambient light, and the proximity sensor may disable the display panel 7061 and/or backlight when the terminal 700 approaches an ear. As a type of the motion sensor, an accelerometer sensor may detect magnitude of an acceleration in each direction (generally three axes), and may detect magnitude and a direction of gravity when being static. The accelerometer sensor may be used for recognizing a terminal gesture (for example, horizontal and vertical screen switching, a related game, or magnetometer posture calibration), a function related to vibration recognition (for example, a pedometer or a strike), or the like. The sensor 705 may further include a fingerprint sensor, a pressure sensor, an iris sensor, a molecular sensor, a gyroscope, a barometer, a hygrometer, a thermometer, an infrared sensor, and the like. This is not described herein.

The display unit 706 is configured to display information entered by the user or information provided for the user. The display unit 706 may include a display panel 7061, and the display panel 7061 may be configured in a form of a liquid crystal display (LCD), an organic light-emitting diode (OLED), or the like.

The user input unit 707 may be configured to receive input digit or character information and generate key signal input related to user setting and function control of a terminal. Specifically, the user input unit 707 includes a touch panel 7071 and another input device 7072. The touch panel 7071, also referred to as a touchscreen, may collect a touch operation performed by the user on or near the touch panel 7071 (for example, an operation performed by the user on or near the touch panel 7071 by using any suitable object or accessory such as a finger or a stylus). The touch panel 7071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 710, and can receive and execute a command sent by the processor 710. In addition, the touch panel 7071 may be implemented by using a plurality of types such as a resistive type, a capacitive type, an infrared ray, and a surface acoustic wave. The user input unit 707 may include another input device 7072 in addition to the touch panel 7071. Specifically, the another input device 7072 may include but is not limited to one or more of a physical keyboard, a function key (such as a volume control key or an on/off key), a trackball, a mouse, a joystick, and the like. Details are not described herein.

Further, the touch panel 7071 may cover the display panel 7061. After detecting the touch operation on or near the touch panel 7071, the touch panel 7061 transmits the touch operation to the processor 710 to determine a type of a touch event, and then the processor 710 provides corresponding visual output on the display panel 7061 based on the type of the touch event. In FIG. 7, the touch panel 7071 and the display panel 7061 are used as two independent components to implement input and output functions of the terminal.

However, in some embodiments, the touch panel 7071 and the display panel 7061 may be integrated to implement the input and output functions of the terminal. This is not specifically limited herein.

The interface unit 708 is an interface connecting an external apparatus to the terminal 700. For example, the external apparatus may include a wired or wireless headset port, an external power supply (or battery charger) port, a wired or wireless data port, a storage card port, a port configured to connect to an apparatus having an identification module, an audio input/output (input/output, I/O) port, a video I/O port, a headset port, and the like. The interface unit 708 may be configured to receive input (for example, data information and power) from the external apparatus and transmit the received input to one or more elements in the terminal 700, or may be configured to transmit data between the terminal 700 and the external apparatus.

The memory 709 may be configured to store a software program and various data. The memory 709 may mainly include a program storage area and a data storage area. The program storage area may store an operating system, an application program required by at least one function (such as a sound play function or an image play function), and the like. The data storage area may store data (such as audio data or an address book) or the like created based on use of the mobile phone. In addition, the memory 709 may include a high-speed random access memory, and may further include a non-volatile memory such as at least one magnetic disk storage component, a flash memory component, or another volatile solid-state storage component.

The processor 710 is a control center of the terminal, and is connected to all parts of the entire terminal by using various interfaces and lines, and performs various functions of the terminal and processes data by running or executing the software program and/or the module that are stored in the memory 709 and invoking the data stored in the memory 709, to implement overall monitoring on the terminal. The processor 710 may include one or more processing units. Optionally, the processor 710 may be integrated with an application processor and a modem processor. The application processor mainly processes an operating system, a user interface, an application program, and the like, and the modem processor mainly processes wireless communication. It may be understood that the modem processor may alternatively not be integrated into the processor 710.

The terminal 700 may further include a power supply 711 (such as a battery) that supplies power to each component. Optionally, the power supply 711 may be logically connected to the processor 710 by using a power management system, to implement functions such as charging, discharging, and power consumption management by using the power management system.

In addition, the terminal 700 may further include some function modules not shown, and details are not described herein.

Figure 8:
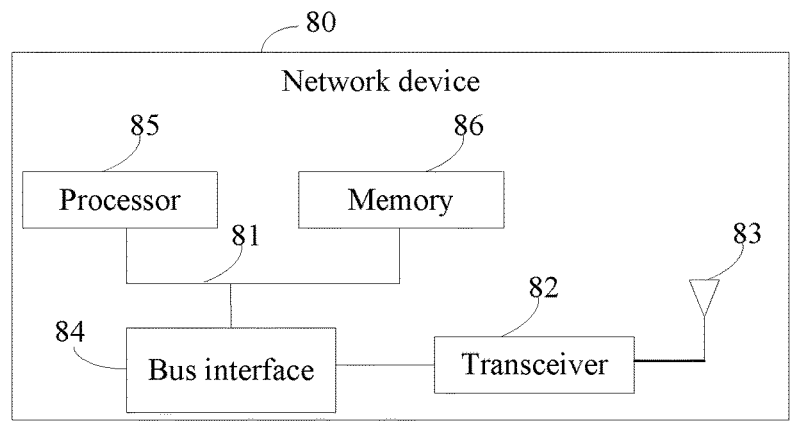
FIG. 8 is a second schematic diagram of a structure of a network device according to an embodiment of the present disclosure.

FIG. 8 is a schematic diagram of a hardware structure of a network device for implementing embodiments of the present disclosure. The network device 80 includes but is not limited to a bus 81, a transceiver 82, an antenna 83, a bus interface 84, a processor 85, and a memory 86.

In this embodiment of the present disclosure, the network side device 80 further includes a computer program that is stored in the memory 86 and that can run on the processor 85. When the computer program is executed by the processor 85, the following steps are implemented:

sending a paging message to a terminal; and when the paging message includes indication information indicating that downlink data of the terminal is to be sent, sending the downlink data of the terminal.

The transceiver 82 is configured to receive and send data under the control of the processor 85.

It may be understood that the network device 80 in this embodiment of the present disclosure may implement processes implemented in the foregoing method embodiment shown in FIG. 4 and achieve a same beneficial effect. To avoid repetition, details are not described herein again.

In FIG. 8, in a bus architecture (represented by the bus 81), the bus 81 may include any quantity of interconnected buses and bridges, and the bus 81 links various circuits including one or more processors represented by the processor 85 and a memory represented by the memory 86. The bus 81 may further link various other circuits such as a peripheral device, a voltage regulator, and a power management circuit together. These are all well-known in the art, and therefore are not further described in the present specification. The bus interface 84 provides an interface between the bus 81 and the transceiver 82. The transceiver 82 may be one element or multiple elements, for example, multiple receivers and multiple transmitters, to provide a unit configured to communicate with various other apparatuses on a transmission medium. Data processed by the processor 85 is transmitted on a wireless medium by using the antenna 83. Further, the antenna 83 further receives data and transmits the data to the processor 85.

The processor 85 is responsible for managing the bus 81 and common processing, and may further provide various functions, including timing, a peripheral interface, voltage regulation, power management, and other control functions. The memory 86 may be configured to store data used when the processor 85 performs an operation.

Optionally, the processor 85 may be a central processing unit (CPU), an ASIC, an FPGA, or a complex programmable logic device (CPLD).

An embodiment of the present disclosure further provides a computer-readable storage medium. A computer program is stored in the computer-readable storage medium. When the computer program is executed by a processor, processes of the data receiving method embodiment shown in FIG. 1 can be implemented, or processes of the data sending method embodiment shown in FIG. 4 can be implemented, and a same technical effect can be achieved. To avoid repetition, details are not described herein again. The computer-readable storage medium includes a read-only memory (ROM), a random access memory (RAM), a magnetic disk, an optical disc, or the like.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element.

According to the descriptions of the foregoing implementations, a person skilled in the art may clearly understand that the foregoing method embodiments may be implemented by using software and a required universal hardware platform, or certainly may be implemented by using hardware. However, in many cases, the former is a better implementation. Based on such an understanding, the technical solutions of the present disclosure essentially or the part contributing to related technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of the present disclosure.

A person of ordinary skill in the art may recognize that, with reference to the examples described in the embodiments disclosed herein, units and algorithm steps may be implemented by electronic hardware or a combination of computer software and electronic hardware. Whether these functions are implemented by using hardware or software depends on the specific application and design constraints of the technical solution. A person skilled in the art may use different methods for each particular application to implement the described functions, but such implementation shall not be considered to be outside the scope of the present disclosure.

It may be clearly understood by a person skilled in the art that, for convenience and brevity of description, for a specific working process of the foregoing described system, apparatus, and unit, reference may be made to a corresponding process in the foregoing method embodiments, and details are not described herein again.

In the embodiments provided in this application, it should be understood that the disclosed apparatus and method may be implemented in another manner. For example, the described apparatus embodiment is merely an example. For example, the unit division is merely logical function division. In actual implementation, there may be another division manner. For example, multiple units or components may be combined or integrated into another system, or some features may be ignored or not performed. In addition, the displayed or discussed mutual coupling or direct coupling or communication connection may be through some interfaces, indirect coupling or communication connection of the apparatus or unit, and may be in an electrical, mechanical, or another form.

The units described as separate parts may or may not be physically separate, and parts displayed as units may or may not be physical units, may be located in one place, or may be distributed on multiple network units. Some or all of the units may be selected based on an actual requirement to implement the objectives of the solutions in the embodiments.

In addition, functional units in the embodiments of the present disclosure may be integrated into one processing unit, or each unit may exist separately physically, or two or more units may be integrated into one unit.

The function may be stored in a computer readable storage medium if it is implemented in the form of a software functional unit and sold or used as an independent product. Based on such an understanding, the technical solutions of the present disclosure essentially or the part contributing to related technologies may be implemented in a form of a software product. The computer software product is stored in a storage medium and includes several instructions for instructing a computer device (which may be a personal computer, a server, a network device, or the like) to perform all or some steps in the method described in the embodiments of the present disclosure. The foregoing storage medium includes any medium that can store program code, such as a USB flash drive, a removable hard disk, a ROM, a RAM, a magnetic disk, or an optical disc.

A person of ordinary skill in the art may understand that all or some of the processes in the methods in the foregoing embodiments may be implemented by using a computer program to control related hardware. The program may be stored in a computer readable storage medium. When the program is executed, the processes in the foregoing methods embodiments may be performed. The storage medium includes a magnetic disk, a compact disc, a read-only memory (ROM), a random access memory (RAM), or the like.

It may be understood that the embodiments described in the embodiments of the present disclosure may be implemented by hardware, software, firmware, middleware, microcode, or a combination thereof. For hardware implementation, a module, a unit, a subunit, or the like may be implemented in one or more application specific integrated circuits (ASIC), a digital signal processor (DSP), a digital signal processing device (DSP Device, DSPD), a programmable logic device (PLD), a field-programmable gate array (FPGA), a general purpose processor, a controller, a microcontroller, a microprocessor, another electronic unit configured to perform the functions described in the present disclosure, or a combination thereof.

For software implementations, the techniques described in the embodiments of the present disclosure may be implemented by modules (for example, processes and functions) that perform the functions described in the embodiments of the present disclosure. The software code may be stored in a memory and executed by a processor. The memory may be implemented in or outside the processor.

The embodiments of the present disclosure are described with reference to the accompanying drawings above. However, the present disclosure is not limited to the foregoing specific implementations. The foregoing specific implementations are merely exemplary, but are not limiting. A person of ordinary skill in the art may make many forms without departing from the objective and the scope of the claims of the present disclosure.

The invention claimed is:

1. A data receiving method, applied to a terminal and comprising:
   receiving a paging message; and
   when the paging message comprises indication information indicating that downlink data of the terminal is to be sent, obtaining the downlink data of the terminal;
   wherein before the receiving a paging message, the method further comprises:
   receiving, from a network device, paging message configuration information and configuration information for receiving downlink data associated with the paging message configuration information; wherein
   the configuration information for receiving the downlink data comprises:
   indication information indicating whether to associate to-be-sent downlink data by using the paging message;
   wherein the obtaining the downlink data of the terminal comprises:
   obtaining, by the terminal in an idle or inactive state, through decoding the downlink data of the terminal from a media access control MAC protocol data unit PDU that carries the paging message;
   or
   the configuration information for receiving the downlink data comprises:
   resource configuration information for sending the downlink data;

wherein the obtaining the downlink data of the terminal comprises:
receiving, by the terminal in an idle or inactive state, the downlink data of the terminal at a downlink data receiving location associated with the paging message, wherein the downlink data receiving location is indicated by the resource configuration information for sending the downlink data.

2. The method according to claim 1, wherein the downlink data of the terminal is decoded based on a preset data format.

3. The method according to claim 2, wherein the preset data format is either of the following:
a data format 1: the MAC PDU comprises downlink data of one terminal; or,
a data format 2: the MAC PDU comprises downlink data of multiple terminals.

4. The method according to claim 3, wherein in the data format 1, the downlink data of the terminal is arranged after the paging message; or,
wherein in the data format 2, the downlink data of the multiple terminals is arranged after the paging message in a terminal sequence indicated in the paging message; or,
wherein in the data format 2, downlink data of each terminal is indicated by terminal identification information in a corresponding data header.

5. The method according to claim 1, wherein
the configuration information for receiving the downlink data further comprises
identification information of the paging message.

6. The method according to claim 1, wherein
the configuration information for receiving the downlink data further comprises:
identification information for sending the downlink data.

7. The method according to claim 1, wherein before the receiving the downlink data of the terminal at a downlink data receiving location associated with the paging message, the method further comprises:
sending uplink indication information to the network device.

8. The method according to claim 7, wherein a sending resource location of the uplink indication information is associated with the paging message; or,
wherein the uplink indication information comprises identification information of the terminal; or,
wherein a channel corresponding to the uplink indication information is any one of the following:
a physical random access channel PRACH;
a physical uplink shared channel PUSCH;
a physical uplink control channel PUCCH; or,
a sounding reference signal SRS.

9. The method according to claim 1, wherein when downlink data of multiple terminals is received at the downlink data receiving location associated with the paging message, the receiving the downlink data of the terminal at a downlink data receiving location associated with the paging message comprises:
receiving, by using either of the following information, the downlink data of the terminal at the downlink data receiving location associated with the paging message:
identification information for distinguishing downlink data of different terminals; or,
a preset data packet format for distinguishing downlink data of different terminals.

10. A non-transitory computer-readable storage medium storing a program, wherein when the program is executed by a processor, steps in the data receiving method according to claim 1 are implemented.

11. A data sending method, applied to a network device and comprising:
sending a paging message to a terminal; and
when the paging message comprises indication information indicating that downlink data of the terminal is to be sent, sending the downlink data of the terminal;
wherein before the sending a paging message to a terminal, the method further comprises:
sending, to the terminal, paging message configuration information and configuration information for receiving downlink data associated with the paging message configuration information; wherein
the configuration information for receiving the downlink data comprises:
indication information indicating whether to associate to-be-sent downlink data by using the paging message;
wherein the sending the downlink data of the terminal comprises:
sending, to the terminal in an idle or inactive state, the downlink data of the terminal in a media access control MAC protocol data unit PDU that carries the paging message;
or
the configuration information for receiving the downlink data comprises:
resource configuration information for sending the downlink data;
wherein the sending the downlink data of the terminal comprises:
sending, to the terminal in an idle or inactive state, the downlink data of the terminal at a downlink data sending location associated with the paging message, wherein the downlink data sending location is indicated by the resource configuration information for sending the downlink data.

12. The method according to claim 11, wherein the downlink data of the terminal is sent based on a preset data format.

13. The method according to claim 12, wherein the preset data format is either of the following:
a data format 1: the MAC PDU comprises downlink data of one terminal; or,
a data format 2: the MAC PDU comprises downlink data of multiple terminals.

14. The method according to claim 11, wherein
the configuration information for receiving the downlink data further comprises:
identification information of the paging message.

15. The method according to claim 11, wherein
the configuration information for receiving the downlink data further comprises:
identification information for sending the downlink data.

16. The method according to claim 11, wherein before the sending the downlink data of the terminal at a downlink data sending location associated with the paging message, the method further comprises:
receiving uplink indication information from the terminal.

17. The method according to claim 16, wherein the sending the downlink data of the terminal at a downlink data sending location associated with the paging message comprises:

sending, based on the uplink indication information, the downlink data of the terminal at the downlink data sending location associated with the paging message.

18. A communication device, comprising: a memory, a processor, and a program that is stored in the memory and that can run on the processor, wherein when the program is executed by the processor, the following steps are implemented:

receiving a paging message; and when the paging message comprises indication information indicating that downlink data of the terminal is to be sent, obtaining the downlink data of the terminal;

wherein before the receiving a paging message, the method further comprises:

receiving, from a network device, paging message configuration information and configuration information for receiving downlink data associated with the paging message configuration information; wherein the configuration information for receiving the downlink data comprises:

indication information indicating whether to associate to-be-sent downlink data by using the paging message;

wherein the obtaining the downlink data of the terminal comprises:

obtaining, by the terminal in an idle or inactive state, through decoding the downlink data of the terminal from a media access control MAC protocol data unit PDU that carries the paging message;

or the configuration information for receiving the downlink data comprises:

resource configuration information for sending the downlink data;

wherein the obtaining the downlink data of the terminal comprises:

receiving, by the terminal in an idle or inactive state, the downlink data of the terminal at a downlink data receiving location associated with the paging message, wherein the downlink data receiving location is indicated by the resource configuration information for sending the downlink data.

* * * * *